(12) United States Patent
Adusumalli

(10) Patent No.: US 12,123,770 B2
(45) Date of Patent: Oct. 22, 2024

(54) HOLD OPERATIONS FOR LIGHT-TO-FREQUENCY SENSORS

(71) Applicant: AMS INTERNATIONAL AG, Jona (CH)

(72) Inventor: Ravi Kumar Adusumalli, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 269 days.

(21) Appl. No.: 17/618,447

(22) PCT Filed: Jul. 15, 2020

(86) PCT No.: PCT/EP2020/070001
§ 371 (c)(1),
(2) Date: Dec. 11, 2021

(87) PCT Pub. No.: WO2021/009228
PCT Pub. Date: Jan. 21, 2021

(65) Prior Publication Data
US 2022/0307899 A1    Sep. 29, 2022

Related U.S. Application Data

(60) Provisional application No. 62/875,033, filed on Jul. 17, 2019.

(51) Int. Cl.
*G01J 1/44*        (2006.01)
*G01J 1/02*        (2006.01)

(52) U.S. Cl.
CPC .............. *G01J 1/44* (2013.01); *G01J 1/0233* (2013.01); *G01J 2001/446* (2013.01)

(58) Field of Classification Search
CPC ....... G01J 1/44; G01J 1/0233; G01J 2001/446
See application file for complete search history.

(56) References Cited

U.S. PATENT DOCUMENTS 4,320,970 A  *  3/1982  Dowben ................... G01J 1/42
                                                        356/417
4,433,914 A  *  2/1984  Curran ..................... G01J 1/46
                                                        356/226

(Continued)

FOREIGN PATENT DOCUMENTS

CN        202903330 U      4/2013
CN        105224147 A      1/2016

(Continued)

OTHER PUBLICATIONS

Whiteside et al ("The Polaroid Instant 600 System", Journal of Applied Photographic Engineering, vol. 9, No. 5, Oct. 2, 1983 (Oct. 2, 1983), pp. 150-158).*

(Continued)

*Primary Examiner* — Edmond C Lau
*Assistant Examiner* — Jarreas Underwood
(74) *Attorney, Agent, or Firm* — Tarolli, Sundheim, Covell & Tummino LLP

(57) ABSTRACT

Methods, systems, and apparatus, including computer programs encoded on computer storage media, for a light-to-frequency sensor conversion. In some implementations, a first output waveform is generated from a light signal, a frequency of the first output waveform being based on an intensity of the light signal, including integrating the light signal across multiple clock cycles. In response to receiving a notification, a hold operation is performed to stop integrating the light signal for a period of time. In response to an end of the hold operation, a second output waveform is generated that includes integrating the intensity of the light signal starting from the end of the hold operation over a count of the multiple clock cycles that start after the end of the hold operation by a delay amount. The first output (Continued)

waveform and the second output waveform are summed to determine the intensity of the light signal.

12 Claims, 10 Drawing Sheets

(56) References Cited

U.S. PATENT DOCUMENTS

| | | | | |
|---|---|---|---|---|
| 9,130,070 | B2* | 9/2015 | Deliwala | ........... H01L 31/02016 |
| 2003/0010891 | A1* | 1/2003 | Mizuhara | ................. G01J 1/32 |
| | | | | 250/205 |
| 2006/0027730 | A1* | 2/2006 | Bamji | ................... G01S 7/4863 |
| | | | | 348/E3.018 |
| 2006/0050539 | A1 | 3/2006 | Yang et al. | |
| 2012/0050213 | A1 | 3/2012 | Bokma | |
| 2013/0256513 | A1 | 10/2013 | Kitade | |
| 2015/0099309 | A1* | 4/2015 | Krufka | ................. G01J 3/2803 |
| | | | | 436/171 |
| 2015/0173621 | A1 | 6/2015 | Guo et al. | |
| 2016/0025777 | A1* | 1/2016 | Deliwala | ................ G01R 15/09 |
| | | | | 324/115 |

FOREIGN PATENT DOCUMENTS

| | | | | |
|---|---|---|---|---|
| CN | 105702229 A | 6/2016 | | |
| EP | 0562976 A1 * | 3/1993 | | |
| EP | 2178021 A1 * | 4/2010 | ........... | G06K 7/0008 |
| JP | H08136221 A | 5/1996 | | |
| JP | 2000205951 A | 7/2000 | | |
| JP | 2012002732 A | 1/2012 | | |
| TW | 201348835 A | 12/2013 | | |
| TW | 201635718 A | 10/2016 | | |

OTHER PUBLICATIONS

Google Street View (https://en.wikipedia.org/wiki/Google_Street_View (2024)).*

International Search Report and Written Opinion for corresponding PCT Patent Application No. PCT/EP2020/070001 dated Oct. 27, 2020.

Whiteside, et al., "The Polaroid Instant 600 System", 8188 Journal of Applied Photographic Engineering, vol. 9 Oct. 1983, No. 5, Easton, Pennsylvania, XP-001391006.

EP Office Action for corresponding EP application No. 20745112.1, dated May 13, 2024, 8 pgs.

* cited by examiner

HOLD OPERATIONS FOR LIGHT-TO-FREQUENCY SENSORS

RELATED APPLICATIONS

The present invention is a U.S. National Stage under 35 USC 371 patent application, claiming priority to Serial No. PCT/EP2020/070001, filed on 15 Jul. 2020; which claims priority from U.S. Provisional Patent Application No. 62/875,033 filed 17 Jul. 2019; the entirety of both are incorporated herein by reference.

BACKGROUND

This specification relates generally to light-to-frequency processing.

SUMMARY

In some implementations, a light-to-frequency sensor converts light to a digital output waveform for measuring a brightness of the light. The digital output waveform can include, for example, a pulse stream, that has a frequency directly proportional to the intensity of the light. The digital output waveform can be provided to modern consumer electronics, such as smart phones, televisions, and personal digital assistants, for example.

A light-to-frequency sensor can be used in a variety of applications relating to light measurements, such as measuring ambient light, measuring light absorption/reflection, color sensing, measuring light in dark room environments, and measuring light in non-dark room environments. In each of these applications, the light-to-frequency sensor processes light from one or more particular light sources at a time. However, in some cases, the light from the particular light sources can be obscured by background light or emitted light from one or more other light sources, which can negatively affect the measurement of the intensity of the light from the particular light source. To counter this negative effect, the light-to-frequency sensor can perform a hold operation to delay processing the light from the particular light source until the other light sources cease operation. Once the light sources cease emitting their light, the light-to-frequency sensor can continue measuring the light intensity. The result is an accurate light measurement, regardless of the number of hold operations performed.

The light-to-frequency sensor includes a diode and an integration circuit. During the hold operation, the light sensor disconnects the diode from a negative input of an operational amplifier in the integration circuit. Once the hold operation has completed, e.g., when the other light sources have ceased operation, the light-to-frequency sensor re-connects the diode to the negative input of the operational amplifier in the integration circuit to continue measuring the light from the particular light source. During the connection and the re-connection of the diode from the operational amplifier, the digital output waveform from the integration circuit is disturbed and can include one or more errors that affect an accuracy of the light measurement.

The disconnecting and the re-connecting of the diode with the negative input of the operational amplifier can be a cause of the errors. To account for these errors, the light-to-frequency sensor treats an integration between two hold operations as one count measurement, e.g., one integration. Thus, as will be described in this specification, the counting between two hold operations includes measuring a first portion of clock cycles, e.g., just before the hold operation initiates, and measuring a second portion of clock cycles, e.g., just after the hold operation exits.

In some implementations, during the connection of the diode to the negative input of the operational amplifier, the digital output waveform of the integration circuit includes a particular amount of time for the integration of the light to be accurate. The integration starts substantially immediately after the hold operation exits but the measurement of the frequency of the light starts after a delay of an initialization time, e.g., an amount of time sufficient for the frequency calculation to be accurate. The light-to-frequency sensor adjusts the measurement of the brightness of the light by the initialization time by adding the initialization time to the overall conversion time. Thus, the light-to-frequency sensor operation can correct the error in the hold operation, and measure the light from the particular source accurately even when one or more hold operations are involved.

Using the techniques described in here for correcting an error caused by a hold operation can be applicable to integration circuits having various types of sensors, such as a light sensor (described here), or a temperature sensor, an acoustic sensor, or another type of sensor.

In general, the light-to-frequency sensor can correct the output light measurement irrespective of the number of hold operations performed. Therefore, the light-to-frequency sensor can measure the light accurately, even in instances where the hold operation is performed more frequently, such as low light situations. Additionally, the light-to-frequency sensor can significantly reduce the error induced by the hold operation to less than one count and maintain a constant low error count irrespective of a number of the hold operations. Some benefits of this system include an improved hold operation accuracy with the use of digital logic without requiring additional analog circuits. The light-to-frequency sensor can also be easily integrated and/or incorporated into any of a variety existing light sensor architectures.

In one general aspect, a method includes: generating a first output waveform from a light signal, a frequency of the first output waveform being based on an intensity of the light signal, including integrating the light signal across multiple clock cycles; in response to receiving a notification, performing a hold operation to stop integrating the light signal for a period of time; in response to an end of the hold operation, generating a second output waveform that comprises integrating the intensity of the light signal starting from the end of the hold operation over a count of the multiple clock cycles that start after the end of the hold operation by a delay amount; and summing the first output waveform and the second output waveform to determine the intensity of the light signal.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes obtaining the notification to perform the hold operation that ceases integrating the output waveform for the period of time, wherein the notification represents that a second light source will generate a second light for the period of time that will affect an accuracy of the determined intensity of the light signal.

In some implementations, the error includes a first error and a second error; the first error is detected at a beginning of the hold operation corresponding to a first location in the output waveform and the second error is detected at an end of the hold operation corresponding to a second location in the output waveform.

In some implementations, the method includes determining a full count portion of the multiple clock cycles from a periodic portion of the output waveform.

In some implementations, the method includes determining a partial count portion based on the periodic portion of the output waveform and an initial portion of the output waveform following the end of the hold operation.

In some implementations, the method includes determining a residual count portion based on the periodic portion of the output waveform and ending portion of the output waveform before initialization of the hold operation.

In some implementations, the hold operation further includes disconnecting a photo diode from a negative input of an integrator amplifier and shorting the photo diode to ground to initiate the hold operation; and connecting the photo diode to the negative input of the integrator amplifier.

In some implementations, integrating the multiple clock cycles including the error further includes in response to connecting the photo diode to the negative input of the integrator amplifier, integrating the multiple clock cycles to include the error in the output waveform.

In some implementations, summing the integration of the multiple clock cycles further includes: summing the integration of the clock cycles for a partial count portion, a full count portion, and a residual count portion to determine the intensity of the first light.

In some implementations, the summing the integration of the clock cycles is repeated based on a number of periods in the output waveform.

In some implementations, a resolution of the light intensity is based on a frequency of the multiple clock cycles.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
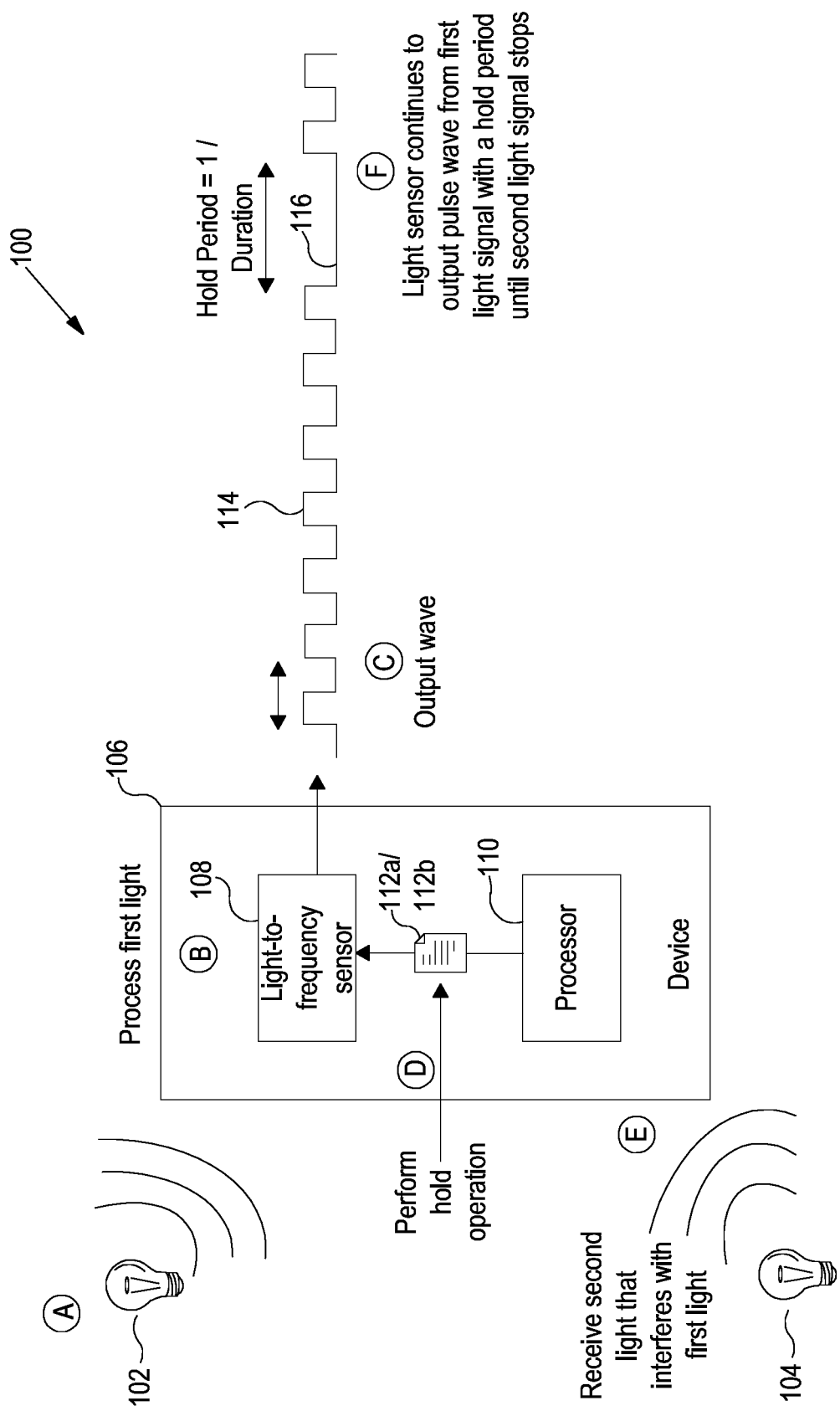
FIG. 1 is a block diagram that illustrates an example of a system for implementing a hold operation in a light-to-frequency sensor.

FIG. 1 is a block diagram that illustrates an example of a system 100 for implementing a hold operation in a light-to-frequency sensor. The system 100 includes a first light source 102, one or more other light sources 104, and a client device 106. The client device 106 includes a light-to-frequency sensor 108 and a processor 110. FIG. 1 illustrates various operations in stages (A) to (F), which can be performed in the sequence indicated or in another sequence.

The client device 106 can include, for example, a mobile phone, a personal computer (PC), a handheld device, a portable digital assistant (PDA), a music player with a display screen, a television, a smart television, an autonomous/non-autonomous vehicle having mounted sensors, and a camera with a display. Additionally, the client device 106 can include other non-computer related devices that have a display screen. As shown in the system 100, the client device 106 can be a handheld mobile device.

The client device 106 receives emitted light from the first light source 102 and processes the light to generate a digital output waveform 114. The frequency of the digital output waveform 114 is directly proportional to an intensity of the light from the first light source 102. However, during the processing of the light from the first light source 102, the processor 110 determines that another light from the one or more other light sources 104 is emitting light, which can impede the measurement of the light from the first light source 102. In some examples, the processor 110 can receive a signal indicating that a second light source is operating, e.g., emitting light, such as if the one or more other light sources 104 include a flashlight on the phone. In some examples, the processor 110 can determine that a second light source is operation and emitting light. In response, the processor 110 can notify the light-to-frequency sensor 108 to cease processing the light from the first light source 102 until the processor 110 has determined the second light source 104 has ceased illuminating light.

In some implementations, the client device 106 can include one or more light or temperature sensors that can detect the presence of light. In particular, the processor 110 can use the data provided by the light or temperature sensors to determine whether light is emitted from the first and/or other light sources 102 and 104. The processor 110 can compare the data from the light and temperature sensors to thresholds to determine whether light is emitted from these sources. For example, the light sensors can include a photovoltaic cell or a photo-emissive cell. The temperature sensors can include a thermosister or a thermostat.

During stage (A), the client device 106 receives light from the first light source 102. The light-to-frequency sensor 108, along with other light and temperature sensors found within the client device 106, can receive the light. In some examples, the light-to-frequency sensor 108, which will be further described below, is sensitive to visible and near infrared light. Light can be measured in units of luminous emittance or luminous flux per unit area. The first light source 102 can emit light from a flashlight, a light from a mobile device, a headlight of a vehicle, a television screen, a display screen of the client device, a window, a combination of these, or other sources to name a few examples. The purpose for converting light to frequency includes display management. In some examples, light to frequency conversion can be used to adjust the brightness of a display screen based on light from an external source.

During stage (B), the light-to-frequency sensor 108 processes the received light from the first light source 102. In particular, the light-to-frequency sensor 108 continuously processes the light from the first light source 102. The light-to-frequency sensor 108 can also process data using other sensors, such as temperature data provided by a temperature sensor.

During stage (C), the light-to-frequency sensor 108 outputs a digital output waveform 114 in response to processing the light from the first light source 102. In particular, the digital output waveform 114 can include a square wave, a sine wave, a saw tooth wave, or other wave types, to name a few examples. The frequency of the digital representation is directly proportional to the intensity of light. As shown in system 100, the light-to-frequency sensor 108 outputs the digital output waveform 114 in the form of a square wave. In some implementations, the light-to-frequency sensor 108 can provide the digital output waveform 114 to one or more circuits within the client device 106 for further processing. In some implementations, the light-to-frequency sensor 108 can provide the digital output waveform 114 to one or more circuits or devices external to the client device 106.

During stage (D), the client device 106 determines that one or more other light sources 104 are emitting light that can affect the light-to-frequency sensor 108's measurement of light from the first light source 102. The processor 110 can receive data from other sensors located within the client device 106 that indicate light is or will be emitted. For example, the processor 110 can receive an indication that a user has selected to power on a light source on the client device 106, such as a display, a flashlight, or a camera flash, which will emit light that can affect the measurement of the light from the first light source 102. In some examples, the processor 110 can determine that other light external to the client device 106 is emitting, such as a light bulb. The processor 110 can receive data from the temperature and light sensors on the client device that indicate light in addition to light from first light source 102 is emitting.

The processor 110 transmits a notification 112a to the light-to-frequency sensor 108 responsive to determining that one or more other light sources 104 will emit light. In response, the light-to-frequency sensor 108 ceases processing the light from the first light source 102 and performs a hold operation. During the hold operation, the light-to-frequency sensor 108 ceases processing the light from the first light source 102 and outputs a low signal 116, such as a signal with a substantially zero output value.

During stage (E), the client device 106 receives second light from one or more other light sources 104. Stage (E) is similar to stage (A), in which light is received from the one or more other light sources 104. The one or more other light sources 104 can include a television, a window, a display, a flashlight, or sunlight, to name a few examples. The second light can disturb the measurement of the light from the first light source 102. To avoid this disturbance, while the second light is emitted, the light-to-frequency sensor 108 will not process the first light from the first light source 102.

During stage (F), the light-to-frequency sensor 108 continues to output digital output waveform 114 during the hold operation. In particular, the digital output waveform 114 includes a low signal 116 in which the digital output waveform 114 includes a substantially zero voltage output during the hold operation, as the light-to-frequency sensor 108 is not processing during the hold operation. For example, the duration of the hold operation can last for 2 second, 5 seconds, or 10 seconds. The hold period, which is illustrated in system 100, is equivalent to one divided by the hold duration and measured in hertz (Hz).

In some implementations, the processor 110 can determine the second light source 104 has ceased emitting light. For example, if the one or more other light sources 104 include a display or flashlight on the client device 106, the processor 110 can receive an indication from that component on the client device 106 requesting to be shut off. In some examples, the processor 110 can receive a notification from a user interacting with the client device 106 to shut off the particular component on the client device 106 that is emitting light. The processor 110 can also receive data from light and temperature sensors located on the client device 106 and determine from the data that the second light source 104 has ceased emitting light. The processor 110 can compare the data to one or more thresholds and determine the second light source 104 has ceased emitting light if the data is found to be below the one or more thresholds.

In response to determining the second light has ceased emitting light, the processor 110 can transmit another notification 112b to the light-to-frequency sensor 108 instructing it to resume processing the first light from the first light source 102. At the end of processing the light from the first light source 102, the light-to-frequency sensor counts the number of pulses in the digital output waveform 114 to determine the brightness of the light from the first light source 102. The higher the number of pulses in the digital output waveform 114, the higher the intensity of the light. Alternatively, the lower the number of pulses in the digital output waveform 114, the lower the intensity of the light.

Figure 2:
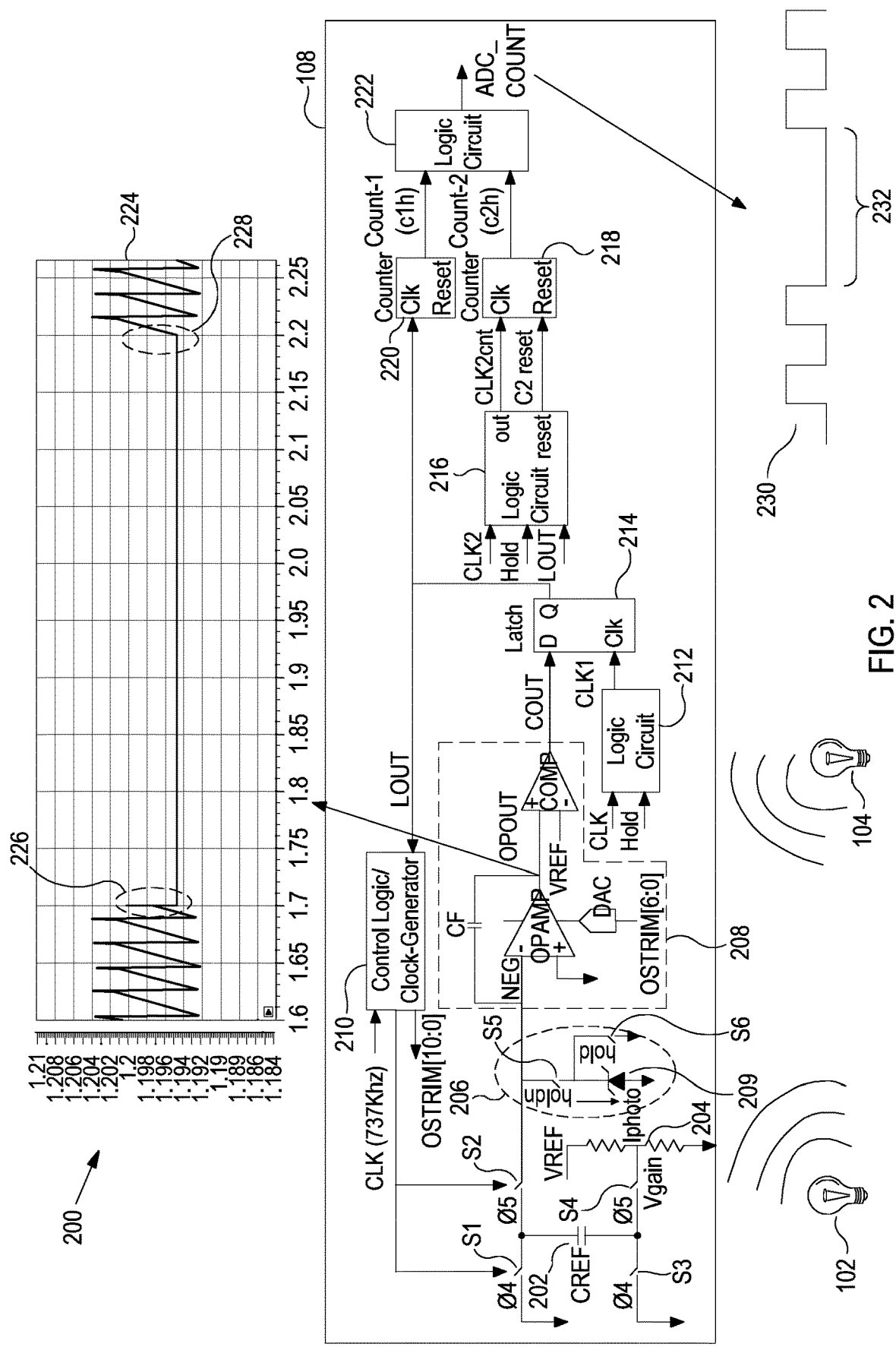
FIG. 2 is a block diagram that illustrates an example of a system for implementing a hold operation in a light-to-frequency sensor.

FIG. 2 is a block diagram that illustrates an example of a system 200 for implementing a hold operation in a light-to-frequency sensor. The system 200 includes a first light source 102, one or more other light sources 104, a light-to-frequency sensor 108, and various components within the light-to-frequency sensor 108, including a capacitor 202 having a value of CREF, a voltage source 204 having a value of VREF, input sensors 206, an integration circuit 208, control logic and control logic/clock-generator 210, a logic circuit 212, a latch circuit 214, a logic circuit 216, a counter circuit 218, a counter circuit 220, and a logic circuit 222. The various components within the light-to-frequency sensor 108 additionally include five switches, S1-S6. In some examples of the system 200, the components can be arranged differently, fewer components can be used, or additional components can be included.

System 200 is similar to system 100 in that the light-to-frequency sensor 108 processes light from a first light source 102. As the light-to-frequency sensor 108 processes light from the first light source 102, the light-to-frequency sensor 108 can also receive light from one or more other light sources 104 that can skew the results of the measurement of the light from the first light source 102.

The input sensors 206 connect to the negative terminal of the operational amplifier in the integration circuit 208. The switch S5 is used to switch between the light sensor 209 and ground in the input sensors 206, e.g., to electronically connect either to the light sensor, e.g., photo diode, or the ground to the negative input terminal in the integration circuit 208. The light sensor 209 can include a diode that receives light and provides photo diode current to the integration circuit 208. The switch S5 connects to ground when the light-to-frequency sensor 108 is instructed to perform the hold operation. Switch S6 is used to connect the negative terminal of the operational amplifier to ground when the switch S6 is closed.

In some implementations, the integration circuit 208 includes an operational amplifier with a negative input terminal and a positive input terminal connected to ground. Additionally, the operational amplifier connects a digital-to-analog converter for providing OSTRIM[6:0]. OSTRIM[6:0] includes seven AZ DAC bits. The AZ DAC bits are used to cancel the offset of the operational amplifier. Typically, an operational amplifier has finite offset across positive and negative input terminals of the operational amplifier. This offset influences the current in the diode, which includes unwanted current. To minimize this unwanted current, the AZ DAC bits, e.g., OSTRIM bits, are used to trim or reduce the offset across operational amplifier. An integration amplifier capacitor CF is connected in parallel with the operation amplifier, e.g., between the output of the operational amplifier and the negative input terminal of the operational amplifier. Additionally, a comparator circuit is included within the integration circuit 208 and is connected to the output of the operational amplifier. In particular, the positive terminal of the operational amplifier circuit connects to the output of the operational amplifier. The comparator circuit connects to a voltage source at its negative terminal and the amplifier output input at its positive terminal. In some implementations, the output of the comparator circuit is the operational amplifier output or the output of the comparator circuit is the voltage reference output. The output of the comparator circuit is the voltage reference output VREF when a voltage of the amplifier output is less than a voltage of the voltage source having value VREF.

The integration circuit 208 also includes a capacitor 202 having a value CREF. The capacitor 202 is connected to the negative input of the operational amplifier in the integration circuit 208 over a switch S2 and connected between two resistors with the VREF voltage source through switch S4. The bottom connector of the capacitor 202, which connects to the two resistors, is connected in parallel to ground through switch S3. The control logic/clock-generator 210 connects to the negative input terminal of the amplifier in the integration circuit 208 through two switches S1 and S2. The switches S1 and S2 can be controlled by one of the logic circuits, e.g., 210, 212, 220, and 222, or by some other external means such as a microcontroller or control logic embedded in a client device associated with the light-to-frequency sensor 108. Additionally, the control logic/clock-generator 210 outputs ten bits from the OSTRIM[10:0] signal. The control logic/clock-generator 210 includes a clock input CLK to receive a system clock. For example, the CLK input can be 737 KHz or another rate.

The light-to-frequency sensor 108 includes a latch circuit 214. The output of the comparator circuit, COUT, connects to the D input of the latch circuit 214. The logic circuit 212 provides a modified clock signal CLK1 to the clock input of the latch circuit 214. The logic circuit 212 receives a clock signal, CLK, and a hold signal for regulating the output clock signal CLK1 to provide to the latch circuit 214. The output of the latch circuit 214, LOUT, connects to the input of the control logic/clock-generator 210, the input of the counter circuit 220, and the input of the logic circuit 216. The controls for the switches, e.g., S1, S2, S3, and S4, are derived from the LOUT signal. These switches can be ON or OFF based on the LOUT signal. For example, if the LOUT signal is high, then switch S2 and switch S4 are ON and switch S1 and S3 are OFF. The switches are required to change to discharge or dump the integrator output voltage to the lower threshold value.

The logic circuit 216 receives a second clock signal CLK2, a hold signal, and the LOUT signal from the latch circuit 214. The logic circuit 216 outputs a count signal, labeled CLK2cnt, and a reset signal, labeled C2_reset, to a counter circuit 218. The hold signal received by the logic circuit 216 is typically low, unless the processor of the client device 106 instructs the light-to-frequency sensor 108 to perform a hold operation.

Both counter circuits 220 and 218 output count signals, count-1 (c1h) and count-2 (c2h), signals, respectively. Additionally, both counter circuits 220 and 218 output the count signals to the logic circuit 222. The logic circuit 222 uses the count signals from both counter circuits to generate an ADC_COUNT. In particular, the count on the c1h channel denotes a change in value in the OPOUT signal. The count on the c2h channel denotes a count for the OPOUT signal to calculate the ADC_COUNT. In particular, the c1h output is high when the OPOUT signal crosses the comparator threshold voltage.

In some implementations, the integration circuit 208 performs an analog-to-digital conversion by collecting a photo diode current from the photo diode in the input sensor 206 and converting the respective photo diode current into digital counts. The integration circuit 208 can also perform analog-to-digital conversion by collecting current from a temperature sensor connected in the input sensor 206.

The integration circuit 208 integrates the photo diode current provided by the diode from the input sensor 206 by means of the integration amplifier CF and the corresponding operational amplifier. If the photo diode charge integrated into the integration amplifier CF is larger than a unit charge packet determined by the voltage across the CREF capacitor 202, then the logic circuit 222 will increment the ADC_COUNT by one count and the charge on the integration amplifier CF will be decreased by one unit charge packet, e.g., charge dumping. In some implementations, integrating the photo diode current is performed for a certain period of time, e.g., an overall integration time, which can be 100 milliseconds and determined by a system clock CLK. The number of counts output in ADC_COUNT by the logic circuit 222 during the overall integration time is a measure of brightness of the light signal received by the phot diode in the input sensor 206.

During the light processing from the first light source 102, the photo diode current from the diode is integrated at the negative input terminal of the operational amplifier in the integration circuit 208. As soon as the OPOUT signal, output from the operational amplifier, is larger than the VREF voltage source at the comparator circuit, the comparator signal output COUT is set to a high state. When the COUT signal is set to the high state, the latch circuit 214 outputs a high signal to the logic circuit 216, the control logic/clock-generator 210, and the counter circuit 220. The logic circuit 216 outputs a CLK2cnt pulse wave with a frequency greater than the CLK frequency provided to the control logic/clock-generator 210. For example, the CLK2cnt pulse wave outputs a pulse wave with a frequency of 2 MHz Additionally, the counter circuit 220 outputs a high signal on c1h when the OPOUT signal changes from high to low. Additionally, the counter circuit 218 outputs a clock signal similar to the CLK2cnt signal on the c2h.

As the integration amplifier CF (in the integration circuit 208) integrates the photo diode current from the input sensors 206, the OPOUT increases in voltage, i.e., ramps up. As discussed previously, the ADC_COUNT increases by one when the latch circuit 214 outputs a high state. In response to the ADC_COUNT increasing by one, the control logic/clock-generator 210 switches the switches S2 and S4 to on so that the CREF capacitor 202 and the VREF voltage source is electrically connected to the negative input of the operational amplifier in the integration circuit 208. Consequently, the CREF capacitor 202 and the VREF voltage source previously charged at VGain, at the switch S4, is connected to the negative input of the operational amplifier in the integration circuit 208 and discharges the charge present on the integration capacitor CF, i.e., g charge dumping. The discharging stops after a certain amount of time, as defined by the system CLK (737 KHz).

After the integration capacitor CF fully discharges via charge dumping, the output of the operational amplifier in the integration circuit 208, OPOUT, has a lower voltage than the voltage at the VREF voltage source at the comparator circuit. In response, the control logic/clock-generator 210 disconnects the VREF voltage source and the CREF capacitor 202 from the negative input of the operational amplifier. In particular, the control logic/clock-generator 210 disconnects switches S2 and S4 and connects switches S1 and S3 so that CREF capacitor 202 can discharge and the integration capacitor CF charges. Then, the integration cycle process starts again as the photo diode current is integrated, the voltage of the OPOUT ramps up again.

In some implementations, the above-described integration cycle will repeat a number of times during the overall integration time. The number of counts of ADC_COUNT output by the logic circuit 222 is a convenient measure of the light brightness from the first light source 102. When the light is bright, the photo diode current from the diode will be high, and consequently, the count of the ADC_COUNT will be high. The discharging of the CREF capacitor 202 and the VREF voltage source will occur more frequently when the photo diode is high. Alternatively, when the light is not bright, the photo diode current from the diode will be low, and consequently, the count of the ADC_COUNT will be low. The discharging of the CREF capacitor 202 and the VREF voltage source will occur less frequently when the photo diode is low.

The diagram 224 illustrates the repetitions of the integration cycle. The X-axis illustrates time and the Y-axis illustrates voltage. Starting at 1.61 seconds, the voltage OPOUT ramps up or increases from 1.193 volts to 1.203 volts at 1.63 seconds. This process repeats to create a saw tooth pattern of rising voltage and discharging voltage, as illustrated in diagram 224. The voltage illustrated on diagram 224 can be measured across the integration capacitor CF or from the output of the operational amplifier to ground.

In some implementations, the light-to-frequency sensor receives a notification to perform a hold operation. As illustrated in the example of diagram 224, the hold operation starts at 1.7 seconds and lasts until 2.2 seconds. The processor 110 in the client device 106 can transmit a hold notification to the components of the light-to-frequency sensor 108. In particular, the processor 110 can transmit a notification to the control logic/clock-generator 210, to the logic circuit 212, and to the logic circuit 216. In response to receiving the hold notification, the control logic/clock-generator 210 can connect the switch S5 from the output of the diode in the input sensor 206 to the ground "hold" position. Thus, the integration circuit 208 ceases outputting a voltage value and immediately switches to a zero voltage output. However, since the zero voltage is less than the voltage at the VREF voltage source at the comparator circuit, the comparator circuit outputs the voltage from the VREF voltage source for the COUT. For example, the VREF voltage value is 1.95 volts, as shown in diagram 224. Additionally, the logic circuit 212 can transmit a hold signal to the latch circuit 214 to not output the value COUT. In response, the latch circuit 214 only outputs a zero voltage value on the LOUT line to the control logic/clock-generator 210, to the logic circuit 216, and to the counter circuit 220. Additionally, the counter circuit 220 receives a C1 reset line. Lastly, the logic circuit 216 receives the hold notification, and outputs a zero value on the CLK2cnt line and a high voltage value on the C2 reset line to the counter circuit 218. The c1h output and the c2h output from their respective counter circuits will both be zero. Thus, the logic circuit 222 will output a value of zero. The individual counter circuits for each hold operation and summation of all counts for the hold operations provides the final ADC_COUNT output.

In response to receiving a low value on the hold line, e.g., end the hold operation, the above-described integration cycle repeats the process and the OPOUT voltage value starts to ramp up. The output of the ADC_COUNT is shown in output waveform 230. Each square pulse corresponds to a count for the intensity of the light and the section 232 of the output waveform 230 corresponds to the time period during the hold operation.

As shown in the diagram 224, when the hold operation is active, the light-to-frequency sensor 108 moves from integrating the photo diode current to performing the hold operation. This means the photo diode in the input sensor 206 is disconnected from the negative input terminal of the operational amplifier in the integration circuit 208, shorting the photo diode to ground, and shorting the negative input of the operational amplifier to ground. Next, when the hold operation is de-active or goes low, the photo diode is disconnected from ground and reconnected to the negative input terminal of the operational amplifier through switch S5. During this switch, the photo diode terminal moves from the absolute ground potential to the finite potential, such as 10 microvolts because the operational amplifier has a finite offset even after doing the AZ also. AZ, which means auto-zero, reduces the offset across the operational amplifier by adjusting the OSTRIM bits. Even after adjusting the offset bits (OSTRIM), a finite residual offset will exist, such as 10 microvolts across the operational amplifier. The operational amplifier amplifies the finite offset by a factor of the gain. The gain here is the capacitance value at the voltage source 204 divided by the capacitance value at the integrating capacitor CF. The capacitance value at the voltage source 204 includes the diode capacitance and the gate capacitance of the operational amplifier. The change in the output of the operational amplifier is significantly large even for the small finite offset due to the large gain. This change in the output of the operational amplifier is the cause for errors in the output. This error is linear and increases as the number of hold operations increase.

From the diagram 224, the hold operation creates two errors-error 226, that is associated with the disconnection of the diode from the negative input terminal of the operational amplifier and error 228, that is associated with the reconnection of the diode with the negative input terminal of the operational amplifier. In some implementations, error 228 is much larger compared to error 226 because the photo diode moves from ground to the negative input terminal of the operational amplifier. Due to the finite offset and the large feedback gain of the amplifier, the operational amplifier's output voltage changes significantly, which leads to an error in the measurement count.

Figure 3A:
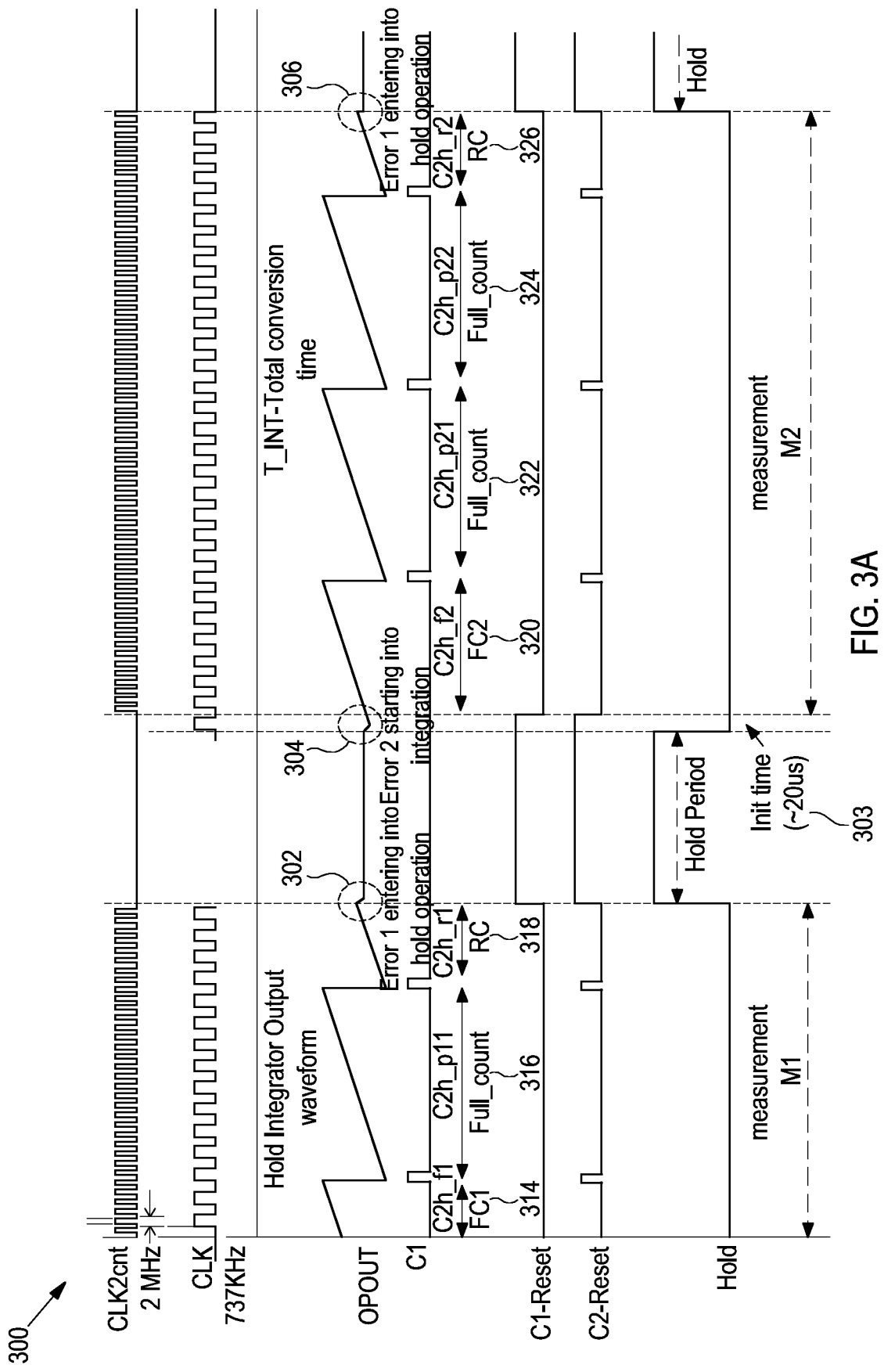
FIG. 3A is a timing diagram for the light-to-frequency sensor during the hold operation.
Figure 3B:
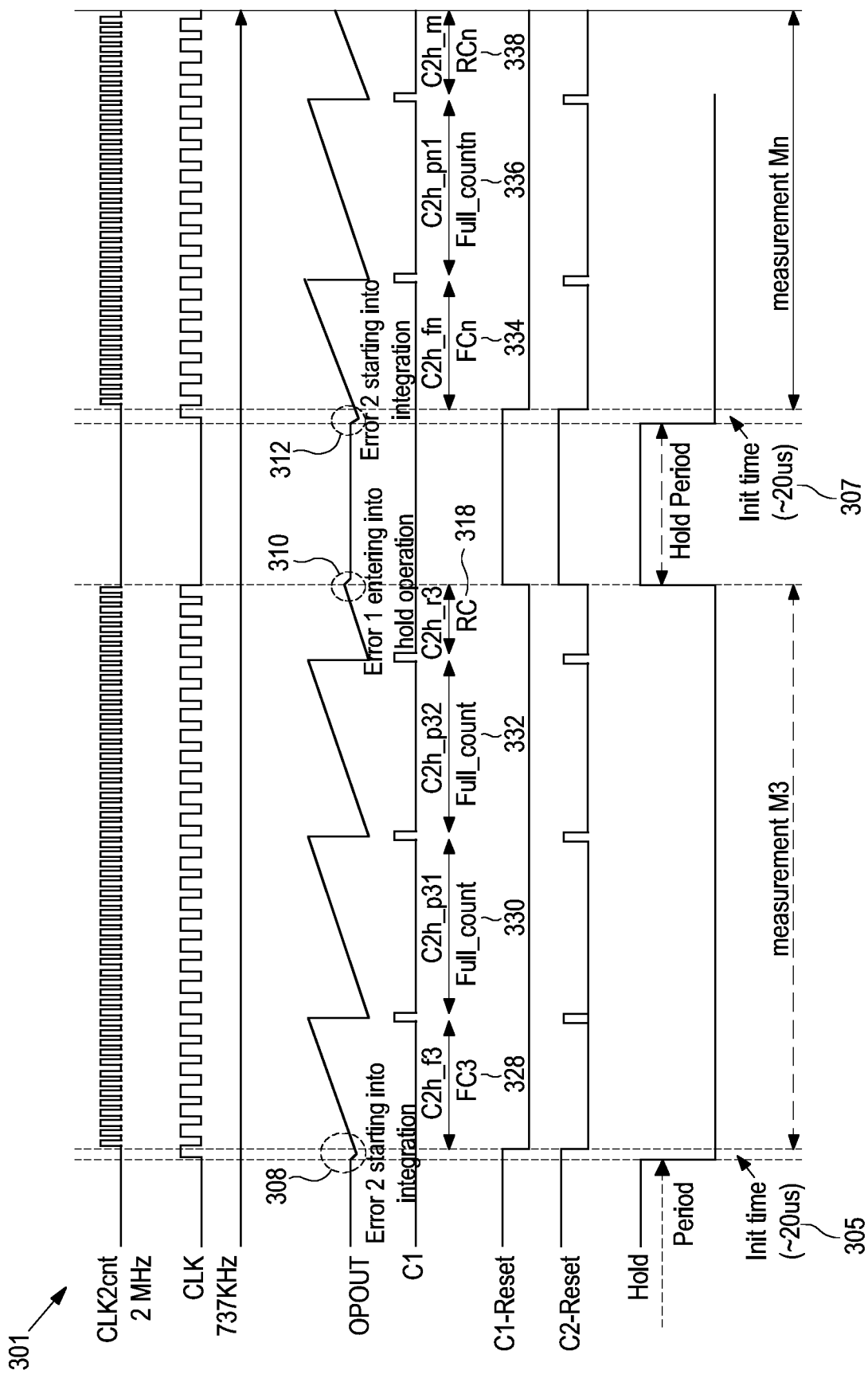
FIG. 3B is a timing diagram showing a continuation of the timing diagram shown in FIG. 3A.

FIG. 3A is a timing diagram 300 for the light-to-frequency sensor during the hold operation. FIG. 3B is a timing diagram 301 showing a continuation of the timing diagram 300 shown in FIG. 3A. The drawing shown in the timing diagram 300 shows circuit configuration outputs and their timing operations. In the timing diagram 300, time runs from left to right. Timing diagram 300 connects with timing diagram 301 shown in FIG. 3B.

The timing diagram 300 includes an output for CLK2cnt signal, a CLK signal, a C1 signal, a C1-Reset signal, a C2-Reset signal, and a hold period signal. The CLK2cnt signal is output from the logic circuit 216 and has a frequency of 2 MHz. The CLK signal is input into the control logic/clock-generator 210 and the logic circuit 212. The OPOUT signal is output from the integration circuit 208. The C2-Reset signal is output from the logic circuit 216 and provided to the counter circuit 218. The hold signal is provided by a component external to the light-to-frequency sensor 108. For example, a processor of the client device 106 or another component of the client device 106 can provide the hold signal.

In some implementations, when control logic/clock-generator 210 receives a clock signal, e.g., CLK signal, the integration circuit 208 begins to execute. Initially, the control logic/clock-generator 210 moves switches S2 and S4 to the off position and moves the switches S1 and S3 to the on position. The integration circuit 208 is then in a closed loop without connecting to the control logic/clock-generator 210. The photo diode current, e.g., the photo diode current from the diode in the input sensors 206, is integrated at the integration circuit 208. In particular, the photo diode current is provided to the negative terminal of the operational amplifier in the integration circuit 208. The operational amplifier integrates the photo diode current and the output voltage OPOUT begins to ramp up. When the OPOUT voltage is greater than the VREF voltage at the comparator circuit, the comparator circuit output COUT is high. The comparator circuit provides the COUT to latch circuit 214. In response, the latch circuit 214 provides a high output signal LOUT at each clock cycle CLK1 provided by the logic circuit 212. Next, the logic circuit 222 receives the high output and outputs an ADC_COUNT of one unit for incrementing the count.

In response to the logic circuit 222 outputting an output of one unit, the control logic/clock-generator 210 sets the switches S2 and S4 to closed and opens the switches S1 and S3. As a result, the charged voltage across the CREF capacitor 202 is injected into the negative terminal of the operational amplifier in the integration circuit 208. At the same time, the logic circuit 222 increments the counter output signal ADC_COUNT by one count. After the injection of the charge voltage across the CREF capacitor 202 is provided to the negative input of the operational amplifier, then the output signal OPOUT is lower than the reference voltage signal VREF at the VREF voltage source, and the CREF capacitor 202 is then recharged. This is achieved by switching switches S2 and S4 open and switches S1 and S3 to close. For charge dumping, the counter increments the counter output signal ADC_COUNT by one count. The number of counts collected during a given overall integration time is a measure of the brightness of the light from the first light source 102.

As previously mentioned, when the hold operation is active, the client device 106 detects another emitting light is present, e.g., one or more other light sources 104, that can skew the measurement of the light from the first light source 102. In particular, during the hold operation, the light-to-frequency sensor 108 moves from integrating the photo diode current to performing the hold operation. This means the photo diode in the input sensor 206 is disconnected from the negative input terminal of the operational amplifier, shorting the photo diode to ground, and shorting the negative input of the operational amplifier to ground. After the hold operation has completed, the photo diode is reconnected to the negative input of the operational amplifier in the integration circuit 208 and continues integrating the photo diode current during its measurement of light from the first light source 102. Due to the disconnection and the reconnection of the photo diode from the negative input terminal of the operational amplifier, the voltage output of the amplifier is disturbed and includes errors. These errors change the output in the ADC_COUNT, and ultimately, affect the light to frequency output count. These errors are apparent in the timing diagram 300. For example, error 302 shows the OPOUT at a point in time when the photo diode disconnects from the negative terminal of the operational amplifier. Error 304 shows the OPOUT at a point in time when the photo diode reconnects to the negative terminal of the operational amplifier.

In the hold operation shown in timing diagram 300, the logic circuit 222 produces a count for the ADC_COUNT for each count output in C2h. Thus, the C2h pulses are used to determine the count for the ADC_COUNT. In particular, one period of a C2h pulse corresponds to a single count for the ADC_COUNT. However, during a hold operation, there are unfinished counts, which disturb the measurement of the ADC_COUNT.

In order to determine the ADC_COUNT, the logic circuit 222 sums the C2h pulses under the ramp up period of OPOUT. As shown in the timing diagram 300, the logic circuit 222 sums the C2h pulses in first part count (FC) 314, full count 316, and residual count (RC) 318. During the hold operation, there are two unfinished counts of the C2h pulses—the RC 318 and the FC 320. The FC 320 includes a start of the integration of the integration circuit 208 after the hold operation ends. The RC 318 includes the unfinished integration count to the end of the integration, e.g., where the hold operation begins.

During the reconnection of the diode to the negative terminal of the operational amplifier, the operational amplifier produces an erred output and includes finite time to return to proper integration of the photo diode current. Thus, in order to resolve the erred output, the light-to-frequency sensor starts integrating immediately after the hold operation exits but the measurement (counter) starts counting only after a delay of a finite initialization time 303. For example, the finite initialization time 303 is 20 microseconds. Not counting until after the finite initialization time 303 has passed is included when the hold operation exits and the integration starts, e.g., connecting the photo diode to the negative input terminal of the operational amplifier. Thus, the total conversion time from the ADC_COUNT will be adjusted accordingly by adding the finite initialization time 303 to the overall integration time. By incorporating the finite initialization time, the light from the first light source 102 can be measured more accurately with n number of hold operations.

The following equations describe the process for counting the ADC_COUNT during n number of hold operations. The ADC_COUNT measurement in period M1 shown in timing diagram 300 is:

$$\text{ADC\_count1} = \quad (1)$$
$$FC1 + \text{Full\_count1} + RC1 = \frac{C2h\_f1}{C2h\_p11} + \Sigma C2h\_p1k + \frac{C2h\_r1}{C2h\_p1k}$$

The ADC_COUNT measurement in period M2 shown in timing diagram 300 is:

$$\text{ADC\_count2} = \quad (2)$$
$$FC2 + \text{Full\_count2} + RC2 = \frac{C2h\_f2}{C2h\_p21} + \Sigma C2h\_p2k + \frac{C2h\_r2}{C2h\_p2k}$$

As shown in timing diagram 301, the ADC_COUNT measurement in period M3 is:

$$\text{ADC\_count1} = \quad (3)$$
$$FC3 + \text{Full\_count3} + RC3 = \frac{C2h\_f3}{C2h\_p31} + \Sigma C2h\_p3k + \frac{C2h\_r3}{C2h\_p3k}$$

As shown in timing diagram 301, the ADC_COUNT measurement in period Mn is:

$$\text{ADC\_countn} = \quad (4)$$
$$FCn + \text{Full\_countn} + RCn = \frac{C2h\_fn}{C2h\_pn1} + \Sigma C2h\_pnk + \frac{C2h\_rn}{C2h\_pnk}$$

The FC1, FC2, FC3, and FCN correspond to the first partial counts of the C2h pulses in their measurement ranges, respectively. Similarly, RC1, RC2, RC3, and RCN correspond to the last partial counts of the C2h in their measurement ranges, respectively.

In some implementations, the first partial count, e.g., FC1 314, FC2 320, FC3 328, and FCN 334, are derived using the secondary counter in their respective measurement ranges. The full secondary counter has the information for one full count, C2h. Thus, to determine the first partial count, FCn, the equation becomes $$\left(\frac{C2h_{fn}}{C2h_{pnk}}\right).$$

The equation for the residual part count, RCN, is $$\left(\frac{C2h_{rn}}{C2h_{pnk}}\right).$$

Based on the information for the full count, the partial count, and the residual count, the total integration time and the total ADC_COUNT can be calculated.

After the end of the total integration time, the logic circuit 222 can calculate the total measurement time that includes the summation of each short intermediate measurements, e.g., M1-Mn.

$$\text{Total integration} = \text{measurement\_time1} + \text{measurement\_time2} + \ldots + \text{measurement\_time}n \quad (5)$$

The total ADC_COUNT is then calculated by summing each of the short measurements of the ADC_COUNT. The following equations show the process for calculating the total ADC_COUNT:

$$\text{ADC\_Count\_final} = \quad (6)$$
$$\text{ADC\_count1} + \text{ADC\_count2} + \ldots + \text{ADC\_countn}$$

$$\text{ADC\_count\_final} = FC1 + \text{Full\_count1} + RC1 + \quad (7)$$
$$FC2 + \text{Full\_count2} + RC2 + FCn + \text{Full\_countn} + RCn$$

$$\text{ADC\_count\_final} = FC1 + FC2 + FCn \; \text{Full\_count1} + \quad (8)$$
$$\text{Full\_count2} + \text{Full\_countn} \; RC1 + RC2 + RCn$$

$$\text{ADC\_count\_final} = \Sigma \, FC + \Sigma \, \text{Full\_count} + \Sigma \, RC \quad (9)$$

$$\text{ADC\_count\_final} = \Sigma \frac{C2h\_fn}{C2h\_pn1} + \Sigma \, \Sigma \, C2h\_pnk + \Sigma \frac{C2h\_rn}{C2h\_pnk} \quad (10)$$

Thus, equations 9 and 10 illustrate the resulting ADC_COUNT using the partial counts, the full counts, and the residual counts shown in timing diagrams 300 and 301. The partial counts, the full counts, and the residual counts are based on the pulses from the C2h signal. These calculations reduce the errors introduced during the hold operation for n number of continuous hold operations. Additionally, these calculations ensure that the ADC_COUNT output is accurate and similar to as if no hold operations were performed. The, ADC_COUNT output is correct irrespective of the number of hold operations performed, a size of the photo diode, and a number of light sources introduced into the system.

Figure 4:
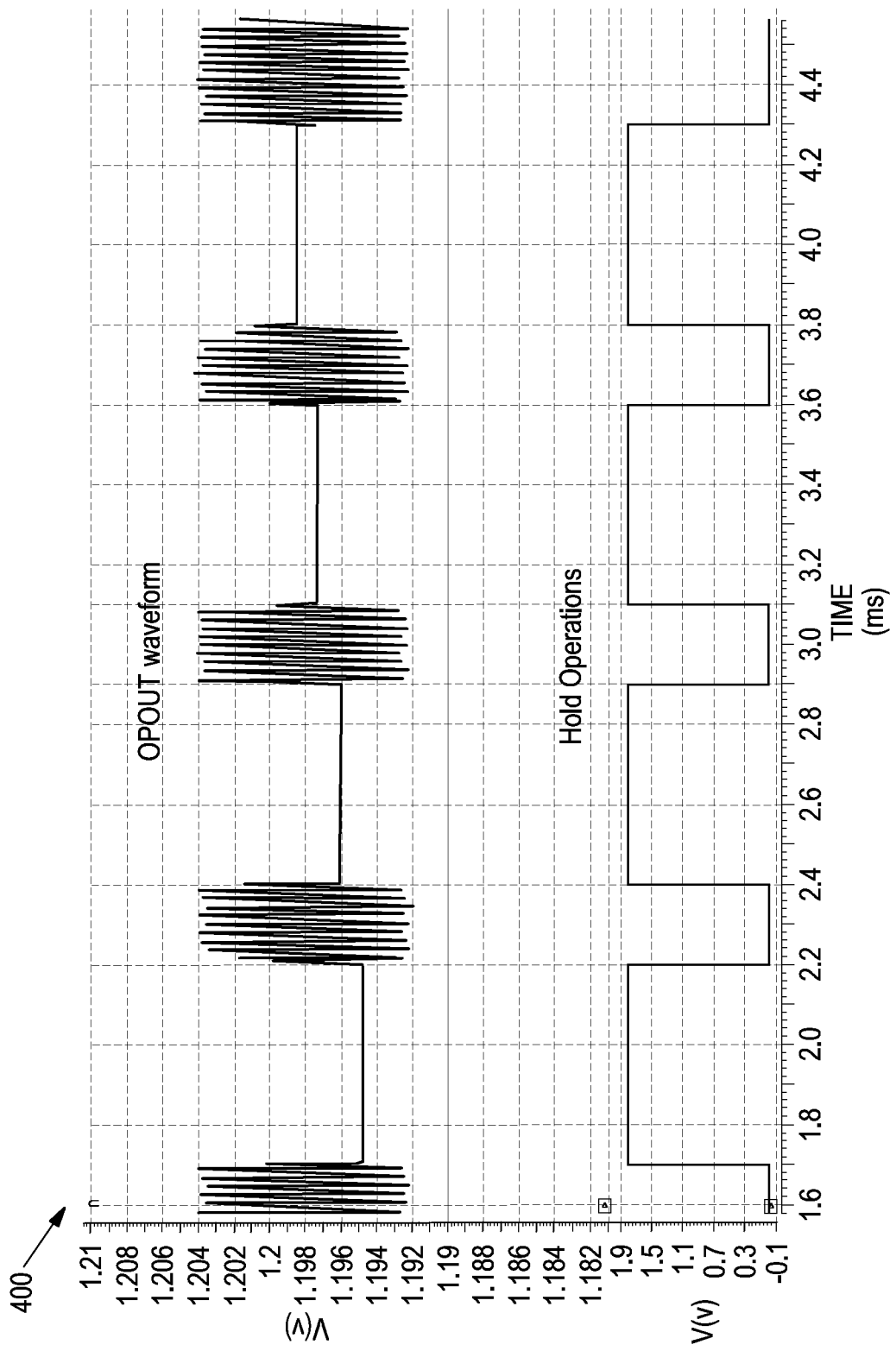
FIG. 4 is a block diagram that illustrates an example of a diagram for the light-to-frequency sensor during continuous hold operations.

FIG. 4 is a block diagram that illustrates an example of a diagram 400 for the light-to-frequency sensor during continuous hold operations. In particular, diagram 400 illustrates the OPOUT waveform during multiple hold operations applying the corrected techniques as previously discussed. At the start and end of each hold operation, the OPOUT waveform does not exhibit any errors from disconnecting the photo diode from the negative input terminal of the operational amplifier and reconnecting the diode. For example, the OPOUT waveform in diagram 400 does not have any errors similar to errors 302, 304, 306, 308, and 310 over n number of hold operations.

Figure 5:
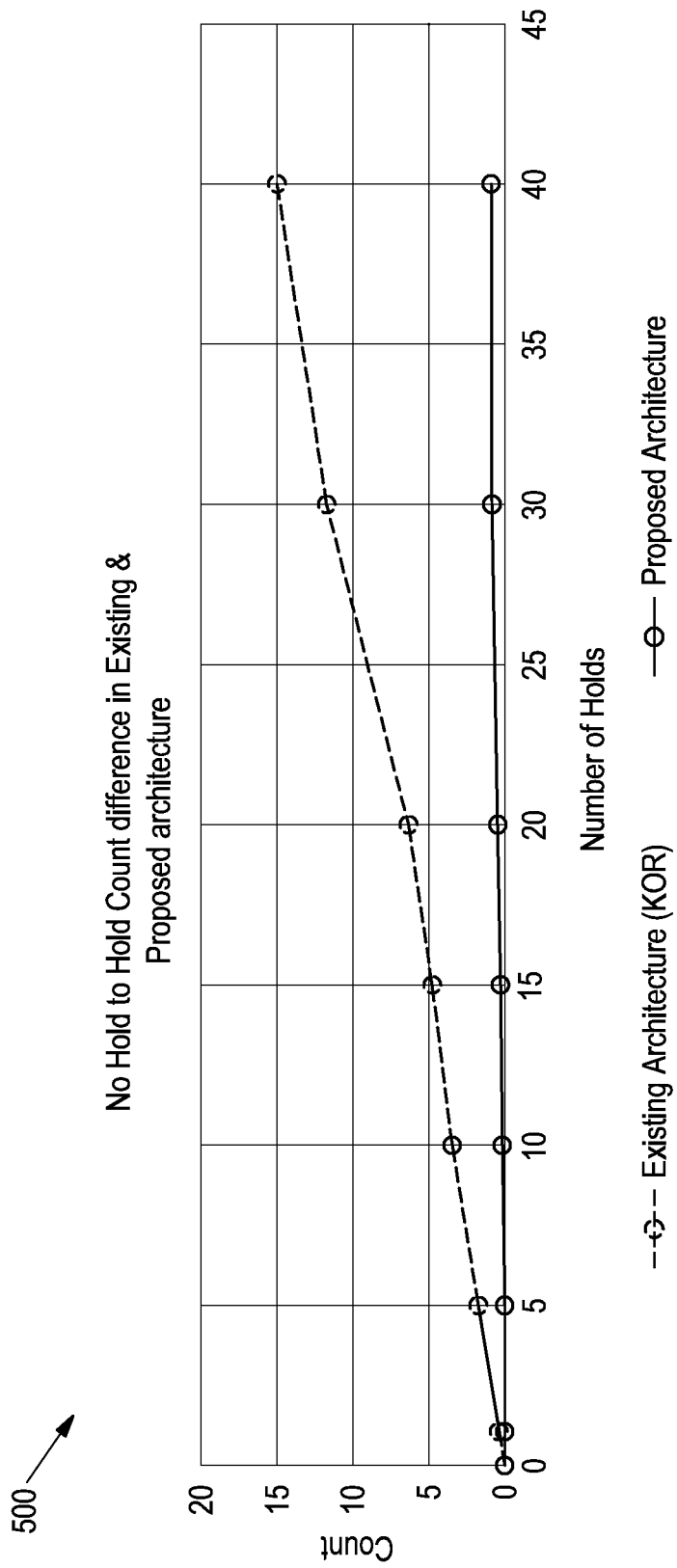
FIG. 5 is a block diagram that illustrates an example of the results due to the improvement of the hold operation.

FIG. 5 is a block diagram 500 that illustrates an example of the results due to the improvement of the hold operation. In particular, the block diagram 500 illustrates the ADC_COUNT on the Y-axis and the number of hold operations performed for the light-to-frequency sensor on the X-axis. As shown in the block diagram 500, without using the proposed technique discussed above, the ADC_COUNT increases as the number of hold operations increase. However, using the proposed technique discussed above, the ADC_COUNT remains the same as the number of hold operations increase.

Figure 6:
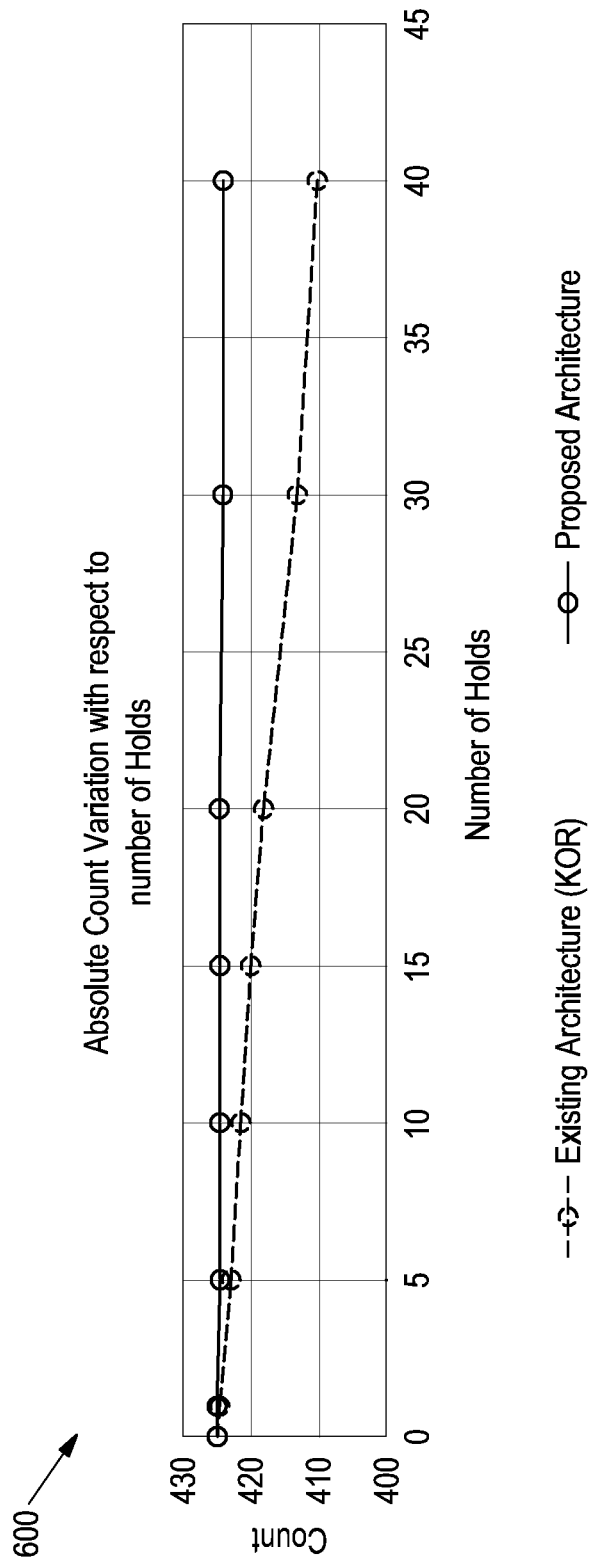
FIG. 6 is a block diagram that illustrates an example of the results due to the improvement of the hold operation.

FIG. 6 is a block diagram 600 that illustrates an example of the results due to the improvement of the hold operation. In particular, the block diagram 600 illustrates the ADC_COUNT variation on the Y-axis and the number of hold operations performed on the X-axis. As shown in the block diagram 600, without using the proposed technique discussed above, the ADC_COUNT variation changes as the number of hold operations increase. However, using the proposed technique discussed above, the variation in the ADC_COUNT does not change as the number of hold operations increase.

The following diagrams below illustrate use cases for measuring various light intensities over a similar number of hold operations.

TABLE 1

Use Case of 150 Count Range

| No. of Holds | Existing Circuit Counts | Proposed Circuit Counts | Existing Circuit Error | Proposed Circuit Error |
|---|---|---|---|---|
| 0 | 141.7 | 141.7 | 0 | 0 |
| 1 | 141.4 | 141.7 | 0.3 | 0 |
| 5 | 140.1 | 141.7 | 1.6 | 0 |
| 10 | 138.5 | 141.7 | 3.2 | 0 |
| 15 | 136.9 | 141.7 | 4.8 | 0 |
| 20 | 135.3 | 141.7 | 6.4 | 0 |
| 30 | 132.1 | 141.7 | 9.6 | 0 |
| 40 | 128.3 | 141.7 | 13.4 | 0 |

As shown in table 1, the counts for the proposed circuit remain the same as the number of hold operations increase. For an actual value of 150 counts for a particular light intensity from a light source, the circuit measures 141.7 counts consistently.

TABLE 2

Use Case of 300 Count Range

| No. of Holds | Existing Circuit Counts | Proposed Circuit Counts | Existing Circuit Error | Proposed Circuit Error |
|---|---|---|---|---|
| 0 | 283.4 | 283.4 | 0 | 0 |
| 1 | 283 | 283.3 | 0.4 | 0.1 |
| 5 | 281.8 | 283.4 | 1.6 | 0 |
| 10 | 280.2 | 283.5 | 3.2 | -0.1 |
| 15 | 278.6 | 283.4 | 4.8 | 0 |
| 20 | 276.1 | 283.5 | 7.3 | -0.1 |
| 30 | 271.8 | 283.4 | 11.6 | 0 |
| 40 | 268.6 | 283.4 | 14.8 | 0 |

As shown in table 2, the counts for the proposed circuit remain the same as the number of hold operations increase. For an actual value of 300 counts for a particular light intensity from a light source, the circuit measures between 283.3 to 283.5 counts, which includes a small error range. In the existing circuit without the use of the proposed technique, the errors increase as the number of hold operations increase.

TABLE 3

Use Case of 450 Count Range

| No. of Holds | Existing Circuit Counts | Proposed Circuit Counts | Existing Circuit Error | Proposed Circuit Error |
|---|---|---|---|---|
| 0 | 425 | 425 | 0 | 0 |
| 1 | 424.7 | 425 | 0.3 | 0 |
| 5 | 423.4 | 424.9 | 1.6 | 0.1 |
| 10 | 421.7 | 424.8 | 3.3 | 0.2 |
| 15 | 420.2 | 424.7 | 4.8 | 0.3 |
| 20 | 418.6 | 424.6 | 6.4 | 0.4 |
| 30 | 413.4 | 424.2 | 11.6 | 0.8 |
| 40 | 410.1 | 424.2 | 14.9 | 0.8 |

As shown in table 3, the counts for the proposed circuit remain roughly the same as the number of hold operations increase. For an actual value of 450 counts for a particular light intensity from a light source, the circuit measures between 424.2 to 425 counts, which includes a small error range, slightly larger than the error range found in table 2. In the existing circuit without the use of the proposed technique, the errors increase as the number of hold operations increase.

TABLE 4

Use Case of 550 Count Range

| No. of Holds | Existing Circuit Counts | Proposed Circuit Counts | Existing Circuit Error | Proposed Circuit Error |
|---|---|---|---|---|
| 0 | 566.6 | 566.6 | 0 | 0 |
| 1 | 566.2 | 566.6 | 0.4 | 0 |
| 5 | 565 | 566.6 | 1.6 | 0 |
| 10 | 562.3 | 566.6 | 4.3 | 0 |
| 15 | 560.8 | 566.8 | 5.8 | -0.2 |
| 20 | 559.1 | 566.8 | 7.5 | -0.2 |
| 30 | 555.2 | 566.6 | 11.4 | 0 |
| 40 | 551.1 | 566.6 | 15.5 | 0 |

As shown in table 4, the counts for the proposed circuit remain the same as the number of hold operations increase. For an actual value of 550 counts for a particular light intensity from a light source, the circuit measures between 566.6 to 566.8 counts, which includes an extremely small error range. In the existing circuit without the use of the proposed technique, the errors increase as the number of hold operations increase.

TABLE 5

Use Case of 850 Count Range

| No. of Holds | Existing Circuit Counts | Proposed Circuit Counts | Existing Circuit Error | Proposed Circuit Error |
|---|---|---|---|---|
| 0 | 850 | 850 | 0 | 0 |
| 1 | 849.5 | 849.9 | 0.5 | 0.1 |
| 5 | 848.3 | 849.8 | 1.7 | 0.2 |
| 10 | 846.6 | 849.8 | 3.4 | 0.2 |
| 15 | 845.1 | 849.7 | 4.9 | 0.3 |
| 20 | 843.6 | 849.8 | 6.4 | 0.2 |
| 30 | 839.3 | 849.9 | 10.7 | 0.1 |
| 40 | 835 | 849.8 | 15 | 0.2 |

As shown in table 5, the counts for the proposed circuit remain roughly the same as the number of hold operations increase. For an actual value of 850 counts for a particular light intensity from a light source, the circuit measures between 849.7 to 850 counts, which includes a small error range. In the existing circuit without the use of the proposed technique, the errors increase as the number of hold operations increase.

TABLE 6

Use Case of 1000 Count Range

| No. of Holds | Existing Circuit Counts | Proposed Circuit Counts | Existing Circuit Error | Proposed Circuit Error |
|---|---|---|---|---|
| 0 | 991.5 | 991.5 | 0 | 0 |
| 1 | 990.1 | 991.7 | 1.4 | -0.2 |

TABLE 6-continued

Use Case of 1000 Count Range

| No. of Holds | Existing Circuit | Proposed Circuit | Existing Circuit | Proposed Circuit |
|---|---|---|---|---|
| | Counts | | Error | |
| 5 | 987.7 | 991.4 | 3.8 | 0.1 |
| 10 | 986.1 | 991.3 | 5.4 | 0.2 |
| 15 | 983.6 | 991 | 7.9 | 0.5 |
| 20 | 982.2 | 991.7 | 9.3 | -0.2 |
| 30 | 977.7 | 991.7 | 13.8 | -0.2 |
| 40 | 974.1 | 992.2 | 17.4 | -0.7 |

As shown in table 6, the counts for the proposed circuit remain roughly the same as the number of hold operations increase. For an actual value of 1000 counts for a particular light intensity from a light source, the circuit measures between 991 to 992.2 counts, which includes a small error range. In the existing circuit without the use of the proposed technique, the errors increase as the number of hold operations increase.

The hold operation counts are different from the no hold operation. The error, for each of the use cases, increases linearly with the number of hold operations. In the proposed technique, the error between the no hold operations to the hold operations is small and, in particular, less than one count. Additionally, this small error in the proposed technique is consistent with respect number of holds. This shows that the hold operation improved drastically from the existing architecture in the given condition and the given diode area size, for example, 56 micro-meters by 56 micro-meters.

Figure 7A:
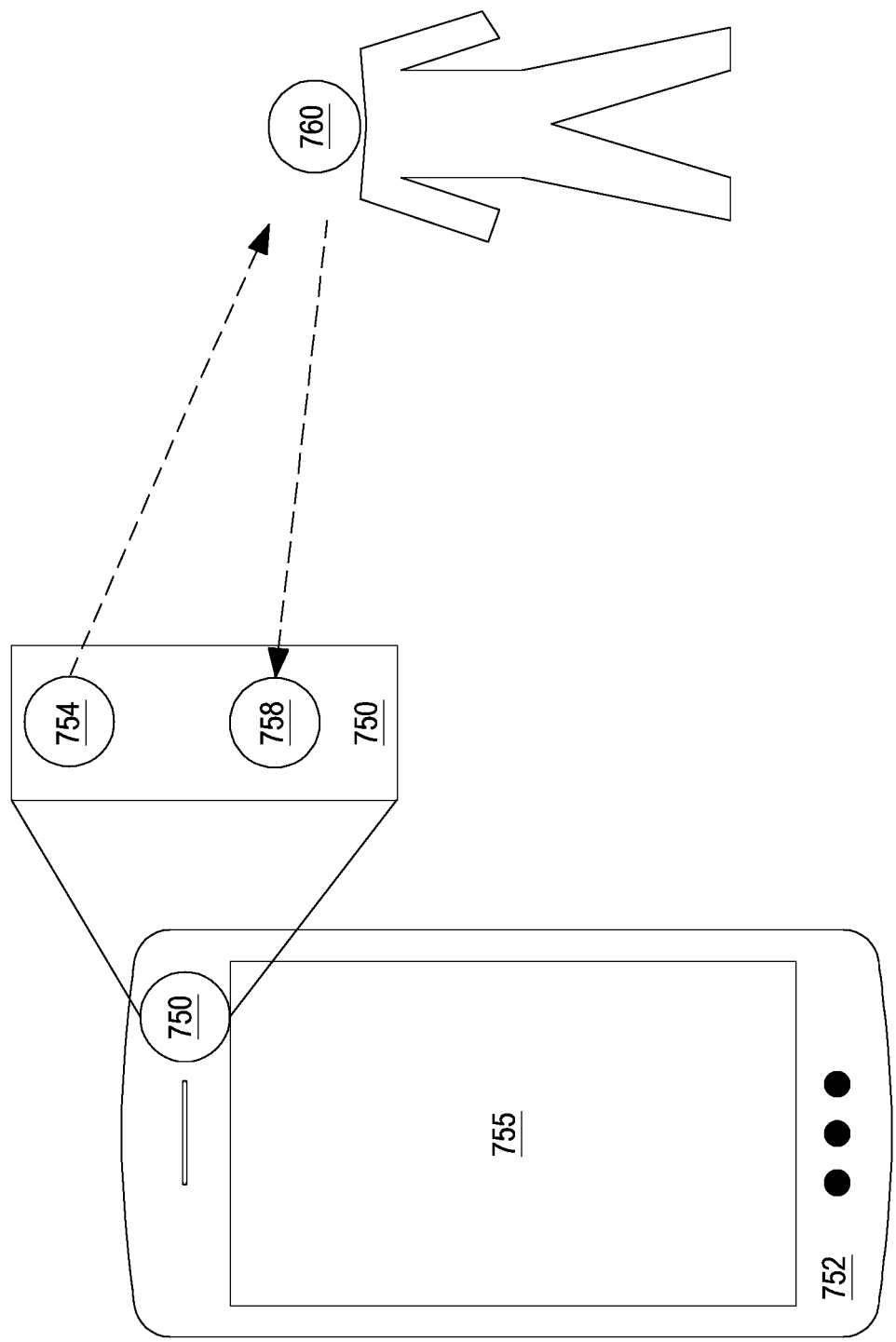
FIG. 7A is a block diagram that illustrates an example of a system for a time of flight mobile device.

Referring to FIG. 7A, in some examples, a light-to-frequency converter 750 such as those described here can be mounted on or incorporated into a front side of a mobile device 752, such as a mobile phone, a tablet, or a wearable computing device. The front side of the mobile device 752 is the side of the device that includes a screen 755. The light-to-frequency converter 750 can be included in a front-side imaging system that includes an illumination device 754 and imaging components including a ToF imaging sensor 758. The front side light-to-frequency converter 750 can be used for measuring light in various low light or ambient light applications, e.g., for facial recognition applications.

Figure 7B:
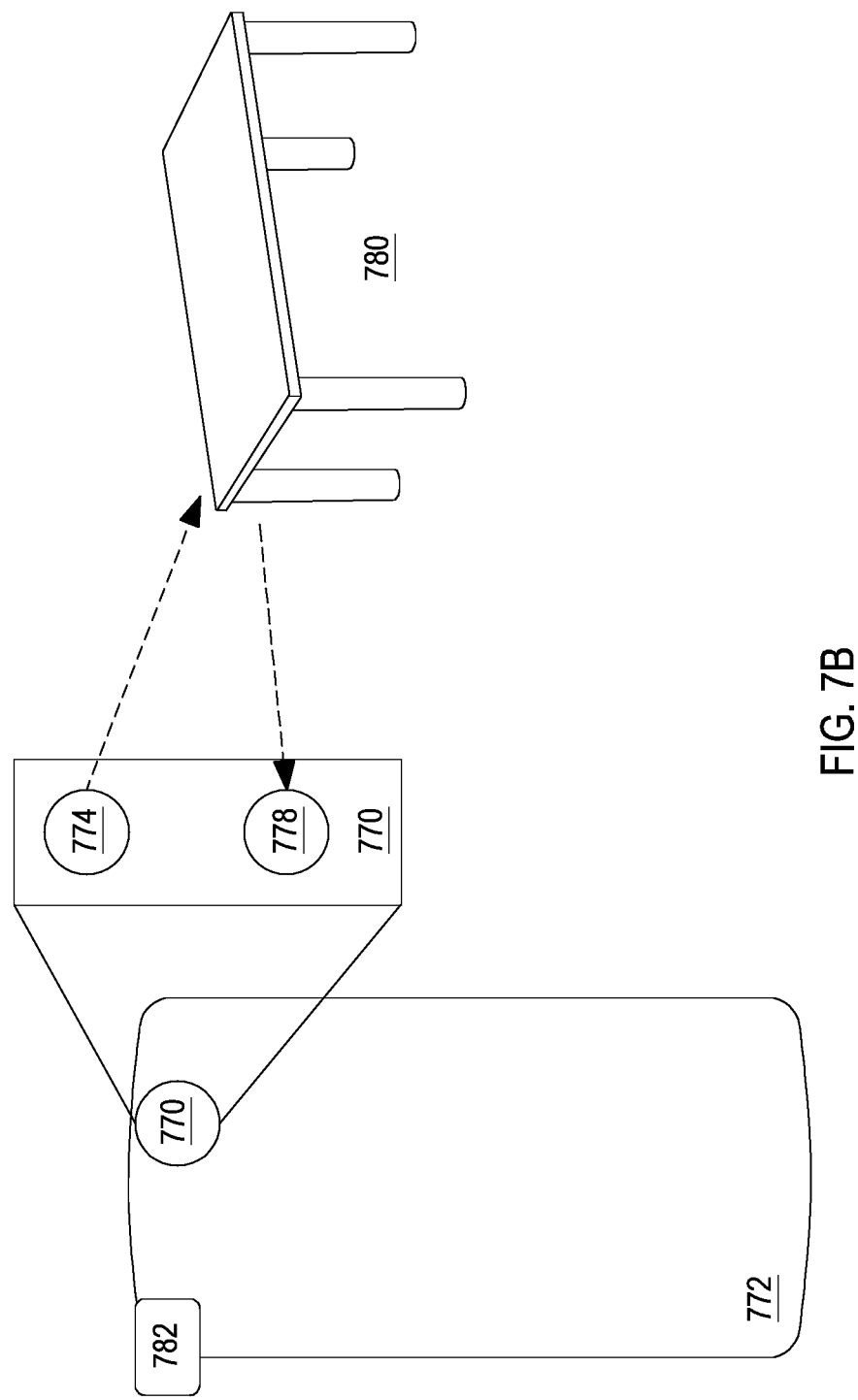
FIG. 7B is a block diagram that illustrates an example of a system for a time of flight mobile device.

Referring to FIG. 7B, in some examples, a light-to-frequency converter 770 can be mounted on a backside of a mobile computing device 772. The backside is the side of the device opposite the front side, such as the side that does not include a screen. The light-to-frequency converter 770 can be a part of a backside imaging system that includes an illumination device 774, imaging components including a ToF imaging sensor 778. The light-to-frequency converter 770 can be used, e.g., in object recognition, for environmental mapping, such as mapping of a room 780, e.g., by one or more processors 782.

The light-to-frequency converter such as those described here can be incorporated into other devices, including autonomous vehicles, game consoles, distance measuring devices, surveillance devices, and other devices.

Figure 8:
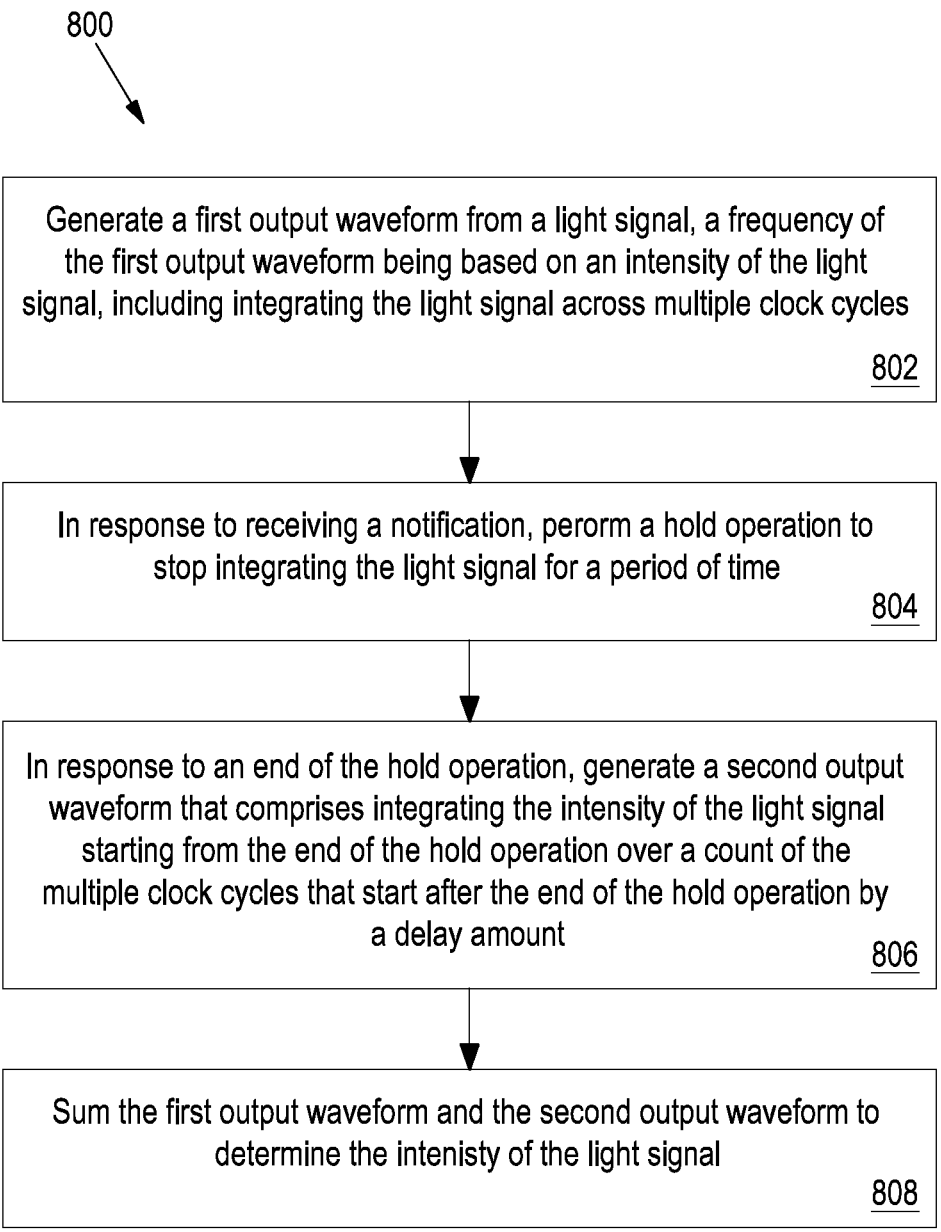
FIG. 8 is a flow diagram that illustrates an example of a process for determining an intensity of a light signal by integrating the light signal over a hold operation.

FIG. 8 is a flow diagram that illustrates an example of a process 800 for determining an intensity of a light signal by integrating the light signal over a hold operation. The process 800 can be performed by the components within the light-to-frequency converter.

A first output waveform is generated from a light signal, a frequency of the first output waveform being based on an intensity of the light signal, including integrating the light signal across multiple clock cycles (802). In particular, the light-to-frequency sensor receives light from a first light source. In response, the light-to-frequency sensor outputs a first digital waveform that has a frequency that is directly proportional to an intensity of the light from the first light source. The first digital waveform can include multiple clock cycles in the form of a square wave, a sine wave, a pulse shaped wave, a saw tooth wave, or another type of wave, to name a few examples.

In response to receiving a notification, a hold operation is performed to stop integrating the light signal for a period of time (804). During the processing of the first light from the first light source, a processor can receive data from other sensors located within the client device that indicate other light is or will be emitted. In response to determining that other light will be emitted, the processor 110 can transmit a notification to the light-to-frequency sensor that indicates to the light-to-frequency sensor to cease processing the light from the first light source. In particular, the light-to-frequency sensor disconnects a diode from a negative terminal of the operational amplifier to cease integrating the light by opening a switch between the diode from the negative terminal of the operational amplifier. Thus, the integration amplifier stops integrating the diode current during the hold operation.

In response to an end of the hold operation, a second output waveform is generated that comprises integrating the intensity of the light signal starting from the end of the hold operation over a count of the multiple clock cycles that start after the end of the hold operation by a delay amount (806). In particular, the light-to-frequency sensor continues to output the second digital waveform in response to the end of the hold operation. The second output waveform includes a section in which the second output waveform goes low during the hold operation, as the light-to-frequency sensor is not processing during the hold operation.

The first output waveform and the second output waveform are summed to determine the intensity of the light signal (808). After processing the light from the first light signal, the light-to-frequency sensor sums the pulses in the first output waveform and the second output waveform to determine the brightness of the light from the first light signal. The higher the pulse count, the brighter the light, e.g., the higher light intensity. Alternatively, the lower the pulse count, the lower the light intensity.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method for converting light to frequency, comprising:
generating a first output waveform from a light signal, a frequency of the first output waveform being based on an intensity of the light signal, including integrating the light signal across multiple clock cycles;
receiving a notification representing a second light source generating a second light for a period of time that affects an accuracy of the intensity of the light signal;
performing a hold operation, based on the notification, to stop integrating the light signal for the period of time;

ending the hold operation after the second light source has ceased generating the second light;

generating a second output waveform that comprises integrating the intensity of the light signal starting from the end of the hold operation over a count of the multiple clock cycles that start after the end of the hold operation by a delay amount; and summing the first output waveform and the second output waveform to determine the intensity of the light signal.

2. The method of claim 1, wherein a first error is detected at a beginning of the hold operation corresponding to a first location in the output waveform and a second error is detected at an end of the hold operation corresponding to a second location in the output waveform.

3. The method of claim 1, further comprising: determining a full count portion of the multiple clock cycles from a periodic portion of the output waveform.

4. The method of claim 3, further comprising: determining a partial count portion based on the periodic portion of the output waveform and an initial portion of the output waveform following the end of the hold operation.

5. The method of claim 3, further comprising: determining a residual count portion based on the periodic portion of the output waveform and ending portion of the output waveform before initialization of the hold operation.

6. The method of claim 1, wherein the hold operation further comprises:

disconnecting a photo diode from a negative input of an integrator amplifier and shorting the photo diode to ground to initiate the hold operation; and connecting the photo diode to the negative input of the integrator amplifier.

7. The method of claim 6, wherein integrating the multiple clock cycles further comprises in response to connecting the photo diode to the negative input of the integrator amplifier, integrating the multiple clock cycles to include the error in the output waveform.

8. The method of claim 1, wherein summing the integration of the multiple clock cycles further comprises: summing the integration of the clock cycles for a partial count portion, a full count portion, and a residual count portion to determine the intensity of the first light.

9. The method of claim 8, wherein the summing the integration of the clock cycles is repeated based on a number of periods in the output waveform.

10. The method of claim 1, wherein a resolution of the light intensity is based on a frequency of the multiple clock cycles.

11. A mobile computing device configured to carry out the method of claim 1.

12. A vehicle configured to carry out the method of claim 1.

* * * * *